Aug. 22, 1933.　　　G. E. PLATZER　　　1,923,745
ELECTRICALLY OPERATED WEIGHING SCALE
Filed Jan. 21, 1932
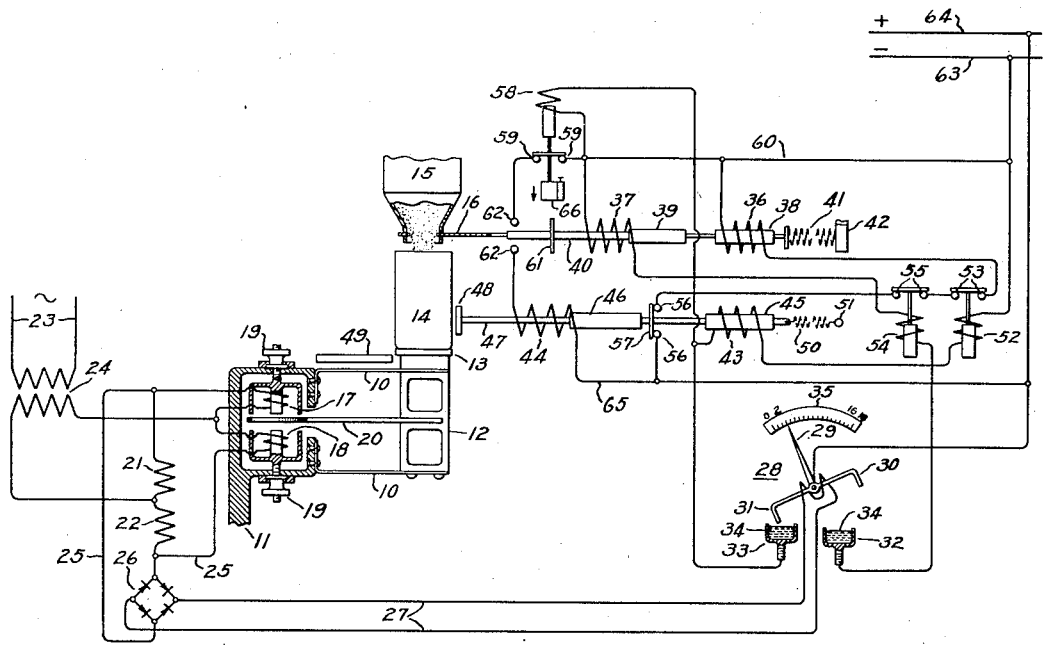
Inventor:
George E. Platzer,
by Charles E. ?alla
His Attorney.

Patented Aug. 22, 1933

1,923,745

UNITED STATES PATENT OFFICE 1,923,745

ELECTRICALLY OPERATED WEIGHING SCALE

George E. Platzer, Schenectady, N. Y., assignor to General Electric Company, a Corporation of New York Application January 21, 1932. Serial No. 587,903

20 Claims. (Cl. 249—59)

My invention relates to electrically operated weighing scales. The principal object of my invention is to provide electrically operated apparatus which will automatically start the flow of some material from a feeding chute into a receptacle underneath the chute at the instant the receptacle is placed on the scale supporting member, and which will automatically stop the flow of the material into the receptacle and automatically remove the latter from the scale supporting member when a predetermined weight of the material has been fed into the receptacle. Another object of my invention is to provide an electrically operated weighing scale which will continuously indicate the weight on the scale supporting member. Further objects of my invention will be mentioned during the course of this specification.

The predominant use for apparatus of the above-mentioned character is for controlling machinery employed to fill many receptacles one after another, with a predetermined weight of some commodity, such as sugar, coffee, soap powder, etc. Electrically operated apparatus of the above-mentioned character has been proposed prior to my invention and a brief description of the underlying principle of the prior art apparatus will help to understand the necessity for and the advantages of my apparatus. So far as I know, the prior art apparatus employs a pivoted lever having two arms, one of which carries a scale weight and the other a supporting member for the receptacle to be filled. One arm of the lever also carries a rod which directly effects the operation of one or more control devices when a predetermined weight of the material has been fed into the receptacle, these control devices shutting off the flow of the material into the receptacle, and in some cases also removing the latter from the supporting member. The tremendous sale of many commodities in prefilled receptacles containing a given weight of the commodity makes it highly desirable to provide electrical apparatus for controlling the receptacle filling machine so that the latter will consistently fill receptacle after receptacle with the same predetermined weight of the commodity without the attention of an operator. The use of a pivoted lever to effect directly the operation of the control devices makes it practically impossible to obtain these results, because of the following reasons: In order to obtain consistent high accuracy operation with the use of a pivoted lever, it is necessary to make that arm of the lever that carries the rod which effects the operation of the control devices considerably longer than the other arm, and to provide damping means for preventing any oscillating motion of the lever during the filling of the receptacle. Mechanical considerations prohibit the use of a very long lever, and it was, therefore, necessary to use a reasonably short lever pivoted on almost frictionless bearings in order to obtain a fair degree of accuracy. This construction, however, tends to make the lever oscillate during the filling operation, especially when the lever is almost balanced, i. e., when nearly the right weight of the commodity has been fed into the receptacle. Obviously, this oscillation, plus the decreased accuracy due to the use of a reasonably short lever, makes it impossible for the lever to control the receptacle filling machine so that the latter will consistently fill receptacle after receptacle with the same predetermined weight of the commodity.

It therefore became desirable to provide electrically operated apparatus which does not employ a long lever, and which preferably does not employ a pivoted lever, and which will, nevertheless, control the receptacle filling machine so that the latter will consistently fill receptacle after receptacle with the same predetermined weight of the commodity.

My invention provides such an apparatus, and, briefly described, it consists, in its simplest form, of a Wheatstone bridge energized by alternating current and having at least one coil connected in one of its arms, a magnetic member adjacent to the coil to function as a part of its magnetic circuit, the coil and magnetic member being relatively movable, and resilient members adapted to carry the receptacle supporting member and vary the relative positions of the coil and magnetic member in accordance with the weight on the supporting member, thus varying the difference of potential across the Wheatstone bridge, caused by an unbalance thereof, during the filling operation of the receptacle. This difference of potential is impressed on electroresponsive means having a movable element whose position varies in accordance with the voltage impressed, this movable element effecting the operation of various control devices so that at the instant a predetermined weight of the material has been fed into the receptacle the flow of material thereinto is stopped and immediately thereafter the receptacle is removed from the supporting member, and at the instant an empty receptacle, or one having less than the predetermined weight of material therein, is placed on the supporting member the flow of material thereinto is commenced.

My invention, however, will be best understood from the following description when considered in connection with the accompanying drawing, which shows a preferred embodiment of my invention, while those features of my invention which are believed to be novel and patentable are pointed out in the appended claims.

In the single figure of the drawing, 10 represents flat springs, one end of each spring being secured to a stationary bracket 11, the remaining ends of the springs being connected by a tie member 12 which carries a receptacle supporting member 13. Supporting member 13 may be of any desired form, but is shown, for the sake of simplicity, as an ordinary scale platform adapted to support a receptacle 14 under a feeding chute 15 having a slidably mounted gate 16. Two spaced apart oppositely disposed coils 17 and 18, preferably provided with magnetic cores, are adjustably secured to bracket 11. The positions of coils 17 and 18 may be adjusted by turning nuts 19. Between the adjacent ends of coils 17 and 18, and acting as a part of their magnetic circuits, is an armature 20 which is made of magnetic material and which is secured to the member 12. Coils 17 and 18 form two arms of a Wheatstone bridge, the other two arms consisting of two impedances 21 and 22. An alternating current source 23 energizes the bridge circuit through a transformer 24. The coils 17 and 18 are preferably duplicates of each other with respect to number of turns, size of wire, etc., and the same is true of impedances 21 and 22. It is clear that when armature 20 is substantially central between the adjacent ends of coils 17 and 18, the bridge will be balanced and there will be substantially no voltage between leads 25 which are connected across opposite terminals of the bridge, and if armature 20 is moved from this central position the bridge will become unbalanced and there will be a voltage between leads 25. Leads 25 are connected to a suitable full wave rectifier 26 which in turn is connected to leads 27, and it is clear that the direct current voltage between leads 27 will be substantially directly proportional to the difference of potential across the bridge, due to an unbalance thereof.

The voltage between leads 27 may be impressed on any suitable electroresponsive means employed for controlling the operation of the various control devices described later, and I therefore wish it clearly understood that my invention is not to be limited to the particular electroresponsive means I am about to describe, since the latter is only one form that may be used. I prefer to impress the voltage between leads 27 on a micro-ammeter 28 having an indicating pointer 29 provided with metallic arms 30 and 31, the details of construction of the micro-ammeter not being shown as they are well known to those skilled in the art. Adjustably mounted metallic cups 32 and 33 contain an electrically conducting fluid 34, such as mercury. Cups 32 and 33 are adjusted so that at a predetermined position of pointer 29 the arm 30 will make contact with the mercury in cup 32, and at another predetermined position of pointer 29 the arm 31 will make contact with the mercury in cup 33. This micro-ammeter really constitutes an electroresponsive relay with two sets of contacts. I also prefer to provide micro-ammeter 28 with a fixed chart 35 under pointer 29, the chart having on its face a series of figures correlated to the weight on the supporting member 13, so that the micro-ammeter always indicates the weight on member 13. Thus, assuming that it is desired to fill receptacle 14 with one pound of some commodity, such as sugar, the figures on chart 35 will represent ounces. The gate 16 has an open position and a closed position. Two electromagnets 36 and 37 have cores of magnetic material 38 and 39, respectively, these cores being secured to a rod 40 which in turn is secured to gate 16. The relative positions of cores 38 and 39 and the coils of their respective electromagnets are such that when core 38 is centrally disposed with respect to the coil of electromagnet 36, the core 39 is not centrally disposed with respect to the coil of electromagnet 37, and vice versa. Furthermore, the cores 38 and 39 are so secured to rod 40 that if electromagnet 36 is energized the gate 16 will be moved to its open position, and if electromagnet 37 is energized the gate 16 will be moved to its closed position. Although not essential, I preferably provide a compression spring 41 between one end of rod 40 and a stationary plate 42 in order to make certain that gate 16 will be closed when neither of electromagnets 36 and 37 is energized, and also to assist in rapidly closing gate 16 when electromagnet 36 is deenergized and electromagnet 37 is energized. Two electromagnets 43 and 44 have cores of magnetic material 45 and 46, respectively, these cores being secured to a rod 47. The end of rod 47 nearest to receptacle 14 is preferably provided with a flange or bumper 48. The relative positions of cores 45 and 46 and the coils of their respective electromagnets are such that when core 45 is centrally disposed with respect to the coil of electromagnet 43 the core 46 is not centrally disposed with respect to the coil of electromagnet 44, and vice versa. Furthermore, the cores 45 and 46 are so secured to rod 47 that if electromagnet 43 is energized the rod 47 will be moved to a position where flange 48 will be adjacent to receptacle 14, as shown in the drawing, and if electromagnet 44 is energized the rod 47 will be moved in the direction to move receptacle 14 off from supporting member 13 to a platform 49 which may be stationary, or which may be movable for automatically carrying away the filled receptacles. Flange 48 should preferably be made of a soft or semi-soft material so that it will not damage receptacle 14 when it is suddenly brought into contact with the receptacle by the energization of electromagnet 44. Although not essential, I preferably provide a tension spring 50 between one end of rod 47 and a stationary pin 51 in order to make certain that rod 47 will be in the illustrated position when neither of electromagnets 43 and 44 is energized, and also to assist in rapidly returning the rod to this position after a receptacle has been moved off supporting member 13.

A relay 52 has a pair of normally closed contacts 53 connected in series with electromagnet 36, the coil of this relay being connected in series with electromagnet 43. A relay 54 has a pair of normally closed contacts 55 connected in series with electromagnet 36, the coil of this relay being connected in series with electromagnet 37. A pair of contacts 56 are connected in series with electromagnet 36 and are positioned so as to be closed by a switch blade 57 secured to rod 47 when the latter is in the illustrated position, i. e., when flange 48 is adjacent to receptacle 14. A relay 58 has a pair of normally closed contacts 59 connected in series with electromagnet 44, one end of the coil of this relay being connected to a lead 60 and the other end of this coil being connected to metallic cup 33. Rod 40 carries a switch blade 61 which is suitably positioned to close a pair of contacts 62 when gate 16 is in its closed position, the contacts 62 being connected in series with electromagnet 44. A source of direct current is represented by lines 63 and 64. Line 63 is connected to lead 60, and line 64 is connected to metallic arms 30 and 31 and is also connected to a lead 65. The free end of the coil of relay 54 is connected to metallic cup 32. The remaining connections between the coils, relays, and leads 60 and 65 are clearly shown in the drawing and need not be described in detail.

The following is a description of the operation of the apparatus. Assume that the empty receptacle 14 weighs two ounces. Coils 17 and 18 will be so adjusted that when there is no receptacle on supporting member 13 the needle 29 will indicate 0 on chart 35; when an empty receptacle is on the supporting member the needle 29 will indicate 2 on this chart; and when a pound of material has been fed into the receptacle the needle 29 will indicate 18 on this chart. It is clear that not only does needle 29 indicate the weight of the material in the receptacle, but, in addition, the movement of metallic arms 30 and 31 is responsive to the movement of supporting member 13. Cup 33 is adjusted so that when needle 29 indicates 0, the arm 31 will make contact with the mercury in this cup, and when needle 29 indicates 2 there will be no contact between arm 31 and the mercury in this cup. Cup 32 is adjusted so that when needle 29 indicates 18 the arm 30 will just make contact with the mercury in this cup. As a convenient starting point for the operating description, I will assume that gate 16 has just opened to permit the flow of material from chute 15 into receptacle 14, and that flange 48 is adjacent to receptacle 14. As shown in the drawing, contacts 56 are closed, contacts 62 are open, and there is no contact between arms 30 and 31 and the mercury in cups 32 and 33. By tracing out the circuits, it is seen that electromagnet 43 and relays 52 and 58 are not energized because there is no contact between arm 31 and the mercury in cup 33, and that electromagnet 37 and relay 54 are not energized because there is no contact between arm 30 and the mercury in cup 32. The contacts of relays 52, 54 and 58 will, therefore, be closed, but electromagnet 44 is not energized because contacts 62 are open. Electromagnet 36, however, is energized, the circuit being from line 64 to lead 65, through contacts 56, 55 and 53, the coil of electromagnet 36, to lead 60, and return to line 63. The gate 16 is, therefore, positively held open by electromagnet 36. As the commodity is fed into the receptacle, the pointer 29 moves to the right, and when a pound of material has been fed into receptacle 14 the pointer 29 indicates 18 on the chart 35 and metallic arm 30 just makes contact with the mercury in cup 32, thus simultaneously completing the circuit for electromagnet 37 and relay 54, the circuit being from line 64, through arm 30, cup 32, coil of relay 54, coil of electromagnet 37, to lead 60, and return to line 63. The energization of relay 54 causes it to open its contacts 55, thus deenergizing electromagnet 36, and the simultaneous energization of electromagnet 37 causes the rapid closing of gate 16. The closing of gate 16 causes blade 61 to close contacts 62, thus completing the circuit for electromagnet 44, this circuit being from line 64, to lead 65, through the coil of electromagnet 44, contacts 62 and 59, to lead 60, and return to line 63. The energization of electromagnet 44 moves rod 47 in the direction to remove receptacle 14 off from supporting member 13 to platform 49.

The removal of receptacle 14 from supporting member 13 causes needle 29 to swing to the left to indicate 0 on the chart 35, thus causing arm 30 to break contact with the mercury in cup 32, and arm 31 to make contact with the mercury in cup 33. The breaking of contact between arm 30 and the mercury in cup 32 opens the circuit for electromagnet 37 and relay 54, thus deenergizing them and causing relay 54 to close its contacts 55. The closing of contacts 55 does not cause electromagnet 36 to become energized, because contacts 56 are now open due to the movement of rod 47 in the direction to move receptacle 14 off supporting member 13; hence, gate 16 will remain closed even without the aid of compression spring 41 until electromagnet 36 is energized. The making of contact between arm 31 and the mercury in cup 33 simultaneously completes the circuits for electromagnet 43 and relays 52 and 58, the circuit being from line 64, through arm 31, cup 33, then dividing into two paths, one path being through the coil of relay 58 to lead 60 and the other path being through the coil of electromagnet 43 and the coil of relay 52 to lead 60, and from lead 60 to line 63. The energization of relay 58 causes it to open its contacts 59, thus deenergizing electromagnet 44, and the energization of electromagnet 43 causes it to move rod 47 to the position shown in the drawing, i. e., to the position where flange 48 will be adjacent to the next receptacle to be placed on the supporting member 13. The movement of rod 47 to this position also causes switch blade 57 to close contacts 56, but this does not cause electromagnet 36 to become energized, because, as previously described, electromagnet 43 and relay 52 became simultaneously energized when arm 31 made contact with the mercury in cup 33; hence, relay 52 opened its contacts 53 before switch blade 57 closed contacts 56, and, therefore, gate 16 remains closed. The instant another receptacle is placed on supporting member 13, needle 29 moves to the right to indicate 2 on chart 35, thus causing arm 31 to break contact with the mercury in cup 33, hence simultaneously deenergizing electromagnet 43 and relays 52 and 58. The deenergization of relay 52 causes it to close its contacts 53, thus completing the circuit for electromagnet 36, which thereupon becomes energized and opens gate 16. The deenergizing of relay 58 causes it to close its contacts 59, but this does not cause the energization of electromagnet 44, because the movement of gate 16 to its open position causes the opening of contacts 62. Although not essential, it is desirable to construct relay 58 so that it will have a slight time delay in closing its contacts 59 when it is deenergized and no appreciable time delay in opening its contacts when it is energized. This type of relay is so well known to those skilled in the art that it is unnecessary to illustrate the structural details producing the time delay; hence, the time delay producing means is diagrammatically represented by the air dashpot 66 attached to the relay and the arrow adjacent to the dashpot, the arrow representing time delay of the relay in closing its contacts when it is deenergized. By making relay 58 have a very small time delay in the closing of its contacts 59, it will assure the opening of contacts 62 before the closing of contacts 59, thus making absolutely certain that electromagnet 44 will not become energized at the instant arm 31 breaks contact with the mercury in cup 33. The very small time delay that relay 52 has in closing its contacts 59 will not cause a slowing up of the operations of filling and removing the receptacles, because these contacts will be closed before the predetermined weight of the commodity has been fed from chute 15 into the receptacle. The deenergization of electromagnet 43 does not effect any movement of rod 47, since electromagnet 44 is also deenergized; hence, rod 47 will remain in the position shown in the drawing, even without the aid of tension spring 50, until electromagnet 44 is energized. The second receptacle is now being filled from chute 15; hence the apparatus is now in the condition assumed at the beginning of the operating description. It follows that the operation of the apparatus on each succeeding receptacle will be a repetition of that described.

By employing springs 10 that have sufficient stiffness, I can eliminate oscillation of supporting member 13, and thus I can eliminate oscillation of pointer 29 and metallic arms 30 and 31 during the entire process of filling and removing the receptacle. By employing a suitable Wheatstone bridge and micro-ammeter 28, and by making suitable adjustments in the bridge and micro-ammeter, I can obtain very large movements of pointer 29 and metallic arms 30 and 31 for very small movements of supporting member 13. Thus, I can easily obtain an amplification factor as high as 100,000, or even higher, between the movement of supporting member 13 and the movement of pointer 29 and arms 30 and 31. It is obvious that such a high amplification factor cannot be obtained with a pivoted lever of practical length such as employed in prior art apparatus. My electrical apparatus, therefore, has a control member which does not oscillate in any of the positions it assumes to effect the energization and deenergization of the various control devices associated with the receptacle filling machine, thus effecting the operation of these control devices in a positive manner and in the proper sequence. In addition, my electrical apparatus has a very high degree of accuracy in effecting the operation of these control devices, thus assuring that receptacle after receptacle will be filled with the correct weight of the commodity. Furthermore, my electrical apparatus is simple, compact, and avoids the use of long levers or other cumbersome mechanical devices. My electrical apparatus also possesses an important advantage in the fact that the micro-ammeter accurately indicates the weight on the supporting member without oscillation of its indicating pointer, thus permitting the operator to determine during the operation of the filling machine whether or not the receptacle is being filled with the correct weight of the commodity. It is also obvious that the micro-ammeter may be used only for the purpose of electrically indicating the weight on the supporting member, in which case, of course, the metallic contact arms carried by the indicating pointer of the micro-ammeter may be omitted.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is,—

1. In combination, a movable weight supporting member whose position varies in accordance with the weight it supports, two coils, a magnetic member located adjacent to said coils to function as a part of their magnetic circuits, said coils and magnetic member being relatively movable, means for changing the relative positions of said coils and magnetic member in response to the movement of said supporting member, means for obtaining from said coils a voltage whose magnitude changes in response to the change in relative positions of said coils and magnetic member, electroresponsive means, connecting means for impressing on said electroresponsive means a voltage whose magnitude is responsive to the voltage obtained from said coils, an electrically operated control device, and means controlled by said electroresponsive means for effecting the operation of said control device at a predetermined position of said weight supporting member.

2. In combination, a movable weight supporting member whose position varies in accordance with the weight it supports, a Wheatstone bridge having a coil connected in one of its arms, a magnetic member located adjacent to said coil to function as a part of its magnetic circuit, said coil and magnetic member being relatively movable, means for changing the relative positions of said coil and magnetic member in response to the movement of said supporting member, electroresponsive means, connecting means for impressing on said electroresponsive means a voltage whose magnitude is responsive to the difference of potential across the Wheatstone bridge, caused by an unbalance thereof, an electrically operated control device, and means controlled by said electroresponsive means for effecting the operation of said control device at a predetermined position of said weight supporting member.

3. An electrically operated weighing scale comprising a movable weight supporting member whose position varies in accordance with the weight it supports, two coils, a magnetic member located adjacent to said coils to function as a part of their magnetic circuits, said coils and magnetic member being relatively movable, means for changing the relative positions of said coils and magnetic member in response to the movement of said supporting member, means for obtaining from said coils a voltage whose magnitude changes in response to the change in relative positions of said coils and magnetic member, an electrical instrument provided with a pointer cooperating with a chart having on its face a series of figures correlated to the weight on said supporting member, said pointer and chart being relatively movable in accordance with the voltage impressed on said instrument, and connecting means for impressing on said instrument a voltage whose magnitude is responsive to the voltage obtained from said coils.

4. An electrically operated weighing scale comprising a movable weight supporting member whose position varies in accordance with the weight it supports, a Wheatstone bridge having a coil connected in one of its arms, a magnetic member located adjacent to said coil to function as a part of its magnetic circuit, said coil and magnetic member being relatively movable, means for changing the relative positions of said coil and magnetic member in response to the movement of said supporting member, an electrical instrument provided with a pointer cooperating with a chart having on its face a series of figures correlated to the weight on said supporting member, said pointer and chart being relatively movable in accordance with the voltage impressed on said instrument, and connecting means for impressing on said instrument a voltage whose magnitude is responsive to the difference of potential across the Wheatstone bridge, caused by an unbalance thereof.

5. In combination, two resilient members, means for securing one end of each resilient member to a stationary body, a tie member for connecting the remaining ends of said resilient members, a supporting member carried by said tie member, a Wheatstone bridge having two stationary spaced apart oppositely disposed coils respectively connected in two of its arms, a magnetic member between the adjacent ends of said coils to function as a part of their magnetic circuits, said magnetic member having one end thereof secured to said tie member, electroresponsive means having a movable element whose position changes in accordance with the voltage impressed on the electroresponsive means, connecting means for impressing on said electroresponsive means a voltage whose magnitude is responsive to the difference of potential across the Weatstone bridge, caused by an unbalance thereof, an electrically operated control device, and means controlled by said movable element for effecting the operation of said control device at a predetermined position of said movable element.

6. An electrically operated weighing scale comprising two resilient members, means for securing one end of each resilient member to a stationary body, a tie member for connecting the remaining ends of said resilient members, a supporting member carried by said tie member, a Wheatstone bridge having two stationary spaced apart oppositely disposed coils respectively connected in two of its arms, a magnetic member between the adjacent ends of said coils to function as part of their magnetic circuits, said magnetic member having one end thereof secured to said tie member, an electrical indicating instrument provided with a movable indicating pointer whose position varies in accordance with the voltage impressed on said instrument, said pointer being adapted to move over a fixed chart having on its face a series of figures correlated to the weight on said supporting member, and connecting means for impressing on said instrument a voltage whose magnitude is responsive to the difference of potential across the Wheatstone bridge, caused by an unbalance thereof.

7. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, means for moving said gate to its open position, means for making said gate opening means ineffective, and means responsive to the position of said supporting member for effecting the operation of the second mentioned means when there is no receptacle on said supporting member.

8. In an automatic weighing scale, the combination of a movable supporting member whose position varies in accordance with the weight it supports, said supporting member being adapted to support a receptacle, means for removing said receptacle from said supporting member, and means responsive to the movement of said supporting member for making said receptacle removing means inoperative when there is no receptacle on said supporting member.

9. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, means for removing said receptacle from said supporting member, means for making said receptacle removing means ineffective, means responsive to the position of said supporting member for making the second mentioned means operative when there is no receptacle on said supporting member and inoperative when there is a receptacle on said supporting member, and means responsive to the closed position of said gate and responsive to the inoperative state of the second mentioned means for effecting the operation of said receptacle removing means.

10. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, an electromagnet for moving said gate to its open position, an electromagnet for moving said gate to its closed position, a relay having a pair of normally closed contacts in series with the first mentioned electromagnet, and means responsive to the position of said supporting member for simultaneously effecting the energization of the second mentioned electromagnet and said relay when a predetermined weight of material has been fed into said receptacle.

11. In an automatic weighing scale, the combination of a movable supporting member whose position varies in accordance with the weight it supports, said supporting member being adapted to support a receptacle, a movable rod, an electromagnet for moving said rod to a position where one of its ends is adjacent to said receptacle, an electromagnet for moving said rod in the direction to move said receptacle off said supporting member, a relay having a pair of normally closed contacts in series with the second mentioned electromagnet, and means responsive to the position of said supporting member for effecting the energization of the first mentioned electromagnet and said relay when there is no receptacle on said supporting member.

12. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, means for moving said gate to its open position, a movable rod having a normally stationary position with one of its ends adjacent to said receptacle, means for moving said rod in the direction to move said receptacle off said supporting member, and means controlled by said rod for making said gate opening means ineffective when the rod moves away from its normally stationary position.

13. An automatic weighing scale comprising a movable supporting member whose position varies in accordance with the weight it supports, said supporting member being adapted to support a receptacle, a feed chute for feeding material into said receptacle, a gate for said chute, said gate having an open position and a closed position, means for moving said gate to its closed position, a movable rod, an electromagnet for moving said rod to a position where one of its ends is adjacent to said receptacle, an electromagnet for moving said rod in the direction to move said receptacle off said supporting member, electroresponsive means, means for impressing on said electroresponsive means a voltage whose magnitude changes in response to changes in the position of said supporting member, means controlled by said electroresponsive means for effecting the operation of said gate closing means when a predetermined weight of material has been fed into the receptacle on said supporting member, and means controlled by said electroresponsive means for effecting the energization of the first mentioned electromagnet and the de-energization of the second mentioned electromagnet when there is no receptacle on said supporting member.

14. An automatic weighing scale comprising a movable supporting member whose position varies in accordance with the weight it supports, said supporting member being adapted to support a receptacle, a feed chute for feeding material into said receptacle, a gate for said chute, said gate having an open position and a closed position, an electromagnet for moving said gate to its open position, an electromagnet for moving said gate to its closed position, a movable rod, an electromagnet for moving said rod to a position where one of its ends is adjacent to said receptacle, an electromagnet for moving said rod in the direction to move said receptacle off said supporting member, a relay having a pair of normally closed contacts in series with the first mentioned electromagnet, a second relay having a pair of normally closed contacts in series with the first mentioned electromagnet, a third relay having a pair of normally closed contacts in series with the last mentioned electromagnet, electroresponsive means, means for impressing on said electroresponsive means a voltage whose magnitude changes in response to changes in the position of said supporting member, means controlled by said electroresponsive means for effecting the energization of the second mentioned electromagnet and the second mentioned relay when a predetermined weight of material has been fed into the receptacle on said supporting member, and means controlled by said electroresponsive means for effecting the energization of the third mentioned electromagnet and the first and last mentioned relays when there is no receptacle on said supporting member.

15. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, an electromagnet for moving said gate to its open position, two relays, each having a pair of normally closed contacts in series with said electromagnet, electroresponsive means, means for impressing on said electroresponsive means a voltage whose magnitude changes in response to changes in the position of said supporting member, means controlled by said electroresponsive means for effecting the energization of one of said relays when a predetermined weight of material has been fed into the receptacle on said supporting member, and means controlled by said electroresponsive means for effecting the energization of the other of said relays when there is no receptacle on said supporting member.

16. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, means for moving said gate to its closed position, a Wheatstone bridge having a coil connected in one of its arms, a magnetic member located adjacent to said coil to function as a part of its magnetic circuit, said coil and magnetic member being relatively movable, means for changing the relative positions of said coil and magnetic member in response to the movement of said supporting member, electroresponsive means, connecting means for impressing on said electroresponsive means a voltage whose magnitude is responsive to the difference of potential across the Wheatstone bridge, caused by an unbalance thereof, and means controlled by said electroresponsive means for effecting the operation of said gate closing means when a predetermined weight of material has been fed into said receptacle.

17. In an automatic weighing scale, the combination of a movable supporting member whose position varies in accordance with the weight it supports, said supporting member being adapted to support a receptacle, a movable rod, an electromagnet for moving said rod to a position where one of its ends is adjacent to said receptacle, an electromagnet for moving said rod in the direction to move said receptacle off said supporting member, a Wheatstone bridge having a coil connected in one of its arms, a magnetic member located adjacent to said coil to function as a part of its magnetic circuit, said coil and magnetic member being relatively movable, means for changing the relative positions of said coil and magnetic member in response to the movement of said supporting member, electroresponsive means, connecting means for impressing on said electroresponsive means a voltage whose magnitude is responsive to the difference of potential across the Wheatstone bridge, caused by an unbalance thereof, and means controlled by said electroresponsive means for effecting the energization of the first mentioned electromagnet and the deenergization of the second mentioned electromagnet when there is no receptacle on said supporting member.

18. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, an electromagnet for moving said gate to its open position, an electromagnet for moving said gate to its closed position, a movable rod, an electromagnet for moving said rod in the direction to move said receptacle off said supporting member, a Wheatstone bridge having a coil connected in one of its arms, a magnetic member located adjacent to said coil to function as a part of its magnetic circuit, said coil and magnetic member being relatively movable, means for changing the relative positions of said coil and magnetic member in response to the movement of said supporting member, electroresponsive means, connecting means for impressing on said electroresponsive means a voltage whose magnitude is responsive to the difference of potential across the Wheatstone bridge, caused by an unbalance thereof, means controlled by said electroresponsive means for effecting the deenergization of the first mentioned electromagnet and the energization of the second mentioned electromagnet when a predetermined weight of material has been fed into the receptacle on said supporting member, and means responsive to the closed position of said gate for effecting the energization of the third mentioned electromagnet.

19. In an automatic weighing scale, the combination of a movable supporting member whose position varies in accordance with the weight it supports, said supporting member being adapted to support a receptacle, a feed chute for feeding material into said receptacle, a gate for said chute, said gate having an open position and a closed position, an electromagnet for moving said gate to its open position, a relay having a pair of normally closed contacts in series with said electromagnet, a movable rod, an electromagnet for moving said rod to a position where one of its ends is adjacent to said receptacle, an electromagnet for moving said rod in the direction to move said receptacle off said supporting member, a relay having a pair of normally closed contacts in series with the last mentioned electromagnet, a Wheatstone bridge having a coil connected in one of its arms, a magnetic member located adjacent to said coil to function as a part of its magnetic circuit, said coil and magnetic member being relatively movable, means for changing the relative positions of said coil and magnetic member in response to the movement of said supporting member, electroresponsive means, connecting means for impressing on said electroresponsive means a voltage whose magnitude is responsive to the difference of potential across the Wheatstone bridge, caused by an unbalance thereof, and means controlled by said electroresponsive means for effecting the energization of the second mentioned electromagnet and both of said relays when there is no receptacle on said supporting member.

20. An automatic weighing scale comprising a movable supporting member whose position varies in accordance with the weight it supports, said supporting member being adapted to support a receptacle, a feed chute for feeding material into said receptacle, a gate for said chute, said gate having an open position and a closed position, an electromagnet for moving said gate to its open position, an electromagnet for moving said gate to its closed position, a movable rod, an electromagnet for moving said rod to a normally stationary position where one of its ends is adjacent to said receptacle, an electromagnet for moving said rod in the direction to move said receptacle off said supporting member, three pairs of contacts connected in series with the first mentioned electromagnet, a relay for controlling one pair of said contacts, a relay for controlling a second pair of said contacts, a switch member controlled by said rod and adapted to close the third pair of said contacts when the rod is in its normally stationary position, two additional pairs of contacts connected in series with the last mentioned electromagnet, a relay for controlling one pair of said additional contacts, a switch member controlled by the gate moving means and adapted to close the second pair of said additional contacts when the gate is in its closed position, a Wheatstone bridge having two spaced apart oppositely disposed coils respectively connected in two of its arms, an armature of magnetic material located adjacent to said coils to function as a part of their magnetic circuits, said coils and armature being relatively movable, means for changing the relative positions of said coils and armature in response to the movement of said supporting member, electroresponsive means, connecting means for impressing on said electroresponsive means a voltage whose magnitude is responsive to the difference of potential across the Wheatstone bridge, caused by an unbalance thereof, said electroresponsive means having a movable element whose position changes in accordance with the voltage impressed on said electroresponsive means, means controlled by said movable element for effecting the energization of the second mentioned electromagnet and the second mentioned relay when a predetermined weight of material has been fed into said receptacle, and means controlled by said movable element for effecting the energization of the third mentioned electromagnet and the first and last mentioned relays when there is no receptacle on said supporting member.

GEORGE E. PLATZER.